US008903601B2

(12) United States Patent
Muirhead

(10) Patent No.: US 8,903,601 B2
(45) Date of Patent: Dec. 2, 2014

(54) LINE REPLACEABLE UNIT FOR AN AIRCRAFT

(75) Inventor: Andrew Muirhead, Norderstedt (DE)

(73) Assignee: Lufthansa Technik AG, Hamburg (DE)

( * ) Notice: Subject to any disclaimer, the term of this patent is extended or adjusted under 35 U.S.C. 154(b) by 876 days.

(21) Appl. No.: 12/963,800

(22) Filed: Dec. 9, 2010

(65) Prior Publication Data

US 2011/0166749 A1 Jul. 7, 2011

(30) Foreign Application Priority Data

Dec. 9, 2009 (DE) .......................... 10 2009 057 568

(51) Int. Cl.
*G06F 7/00* (2006.01)
*G06F 9/445* (2006.01)
*B64D 11/06* (2006.01)

(52) U.S. Cl.
CPC .......... *G06F 8/61* (2013.01); *B64D 2011/0606* (2013.01)
USPC .......................................................... 701/36

(58) Field of Classification Search
None
See application file for complete search history.

(56) References Cited

U.S. PATENT DOCUMENTS

| | | | |
|---|---|---|---|
| 6,973,479 B2 | 12/2005 | Brady, Jr. et al. | |
| 7,114,171 B2 | 9/2006 | Brady et al. | |
| 7,840,770 B2 * | 11/2010 | Larson et al. | 711/165 |
| 8,051,031 B2 | 11/2011 | Sims et al. | |
| 2006/0229772 A1 | 10/2006 | McClary | |
| 2007/0130437 A1* | 6/2007 | Larson et al. | 711/165 |
| 2009/0138874 A1 | 5/2009 | Beck et al. | |
| 2010/0093429 A1* | 4/2010 | Mattice et al. | 463/25 |

FOREIGN PATENT DOCUMENTS

| | | |
|---|---|---|
| EP | 1884464 | 2/2008 |
| WO | WO 2009112663 | 9/2009 |

OTHER PUBLICATIONS

English Translation of the International Preliminary Report on Patentabillity (Chapter I) for International Application PCT/EP2010/007480, mailed Jun. 21, 2012, 8 pages.

* cited by examiner

*Primary Examiner* — Thomas Tarcza
*Assistant Examiner* — Adam Alharbi
(74) *Attorney, Agent, or Firm* — Casimir Jones S.C.

(57) ABSTRACT

The subject matter of the invention is a line replaceable unit (LRU) (2) for an aircraft (1). According to the invention, the LRU has:
a) a first main memory (7) which contains the software required for certification of the LRU (2),
b) a second main memory (8), which is separate from the first main memory (7) and in which a user of the LRU can store individual software which does not adversely affect the certification basis of the LRU.
The subject matter of the invention is, furthermore, an arrangement comprising an LRU according to the invention and a database (12) with appropriate individual software, as well as a corresponding method for operation of an LRU.

18 Claims, 2 Drawing Sheets

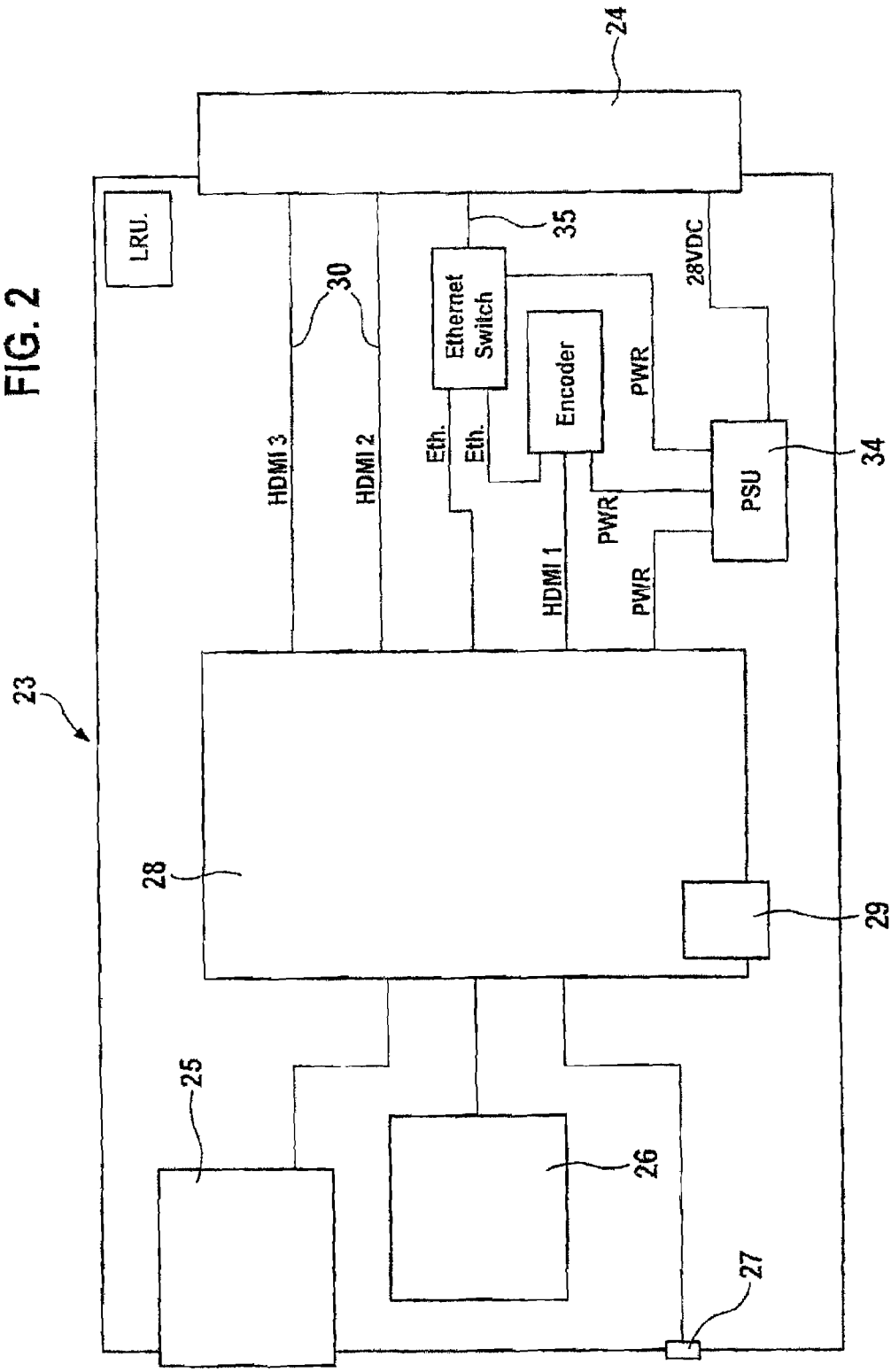

LINE REPLACEABLE UNIT FOR AN AIRCRAFT

This application claims priority to German Application No.: 102009057568.5-53, filed Dec. 9, 2009, which is incorporated herein by reference in its entirety.

The invention relates to a line replaceable unit (LRU) for an aircraft; and to an arrangement and a method for operation of the LRU, as defined in the claims.

The term line replaceable unit is a term which has been introduced in aviation and denotes a complex functional unit which can be replaced in its entirety in a simple manner. An LRU can be replaced in a short time, for example in aircraft parked at the gate, without special technical knowledge being required to carry out the replacement. In general, an LRU has standardized mechanical and/or electrical interfaces to the aircraft, for example standardized installation dimensions, mounting apparatuses and electrical connections. The person carrying out the replacement treats an LRU as a black box, that is to say has no further interest in its design or function. An LRU which has been removed can be repaired, or modified in another way, if necessary in a separate workshop.

In practice, LRUs are also used for a multiplicity of tasks relating to the control of the so-called passenger environment. For example, electrical seat adjustment systems and/or entertainment systems for passengers are normally controlled with the aid of suitable LRUs.

As components which are installed permanently in the aircraft, LRUs are subject to aviation-law certification. This aviation-law certification also extends to the software of LRUs which are controlled by software. Modifications to the LRU or its control software require aviation-law certification.

The invention is based on the object of providing a line replaceable unit of the type mentioned initially which can be used in a more versatile manner. According to the invention, an LRU for an aircraft has the following:

a) a first main memory which contains the software required for certification of the LRU,
b) a second main memory, which is separate from the first main memory and in which a user of the LRU can store individual software which does not adversely affect the certification basis of the LRU.

Some of the terms used for the purposes of the invention will be explained first of all. The term line replaceable unit (LRU) is used as explained above in the context of the invention in conjunction with the prior art.

The term main memory denotes program memory for the LRU, in which executable programs (so-called executables) can be stored. The software required for certification of the LRU is that software or firmware which ensures correct operation of the LRU, as required for aviation-law certification. In general, the LRU can therefore be operated exclusively with this software, which is located in the first main memory, while the individual software in the second main memory described in the following text is not required for this purpose.

The first and second main memories are separate from one another. This means that the content of the first main memory remains unchanged by any changes to the content of the second main memory.

The first and second main memories may be separated either physically, logically or by other suitable measures which ensure the appropriate integrity of the content of the first main memory when the content of the second main memory is changed.

The first main memory contains the software which is required for certification of the LRU, that is to say that software which is required for correct operation of the LRU.

So-called individual software is loaded into the second main memory by the user of an LRU. The user of an LRU may be the operator of the aircraft or (preferably) a passenger in the aircraft, who is using the corresponding LRU for example to control his seat and/or entertainment system. The usability of the LRU can be matched to the requirements of the user by means of the individual software in the second main memory. For example, the individual software can provide the passenger with a modified user interface (for example on a touch screen) for adjusting the seat or entertainment system, can contain preprogrammed preferred seat settings for the user, can store preferred playlists in the entertainment system, or the like.

The individual software in the second main memory does not adversely affect the certification basis of the LRU. This means that the integrity of the software which is stored in the first main memory, and which has also been accepted in the course of the aviation-law certification of the LRU, remains unaffected. On the other hand, the individual software does not intervene in the operation of the LRU in any way which changes its function, safety, etc., beyond the limits allowed in accordance with aviation law. In general, the individual software, as a so-called add-on, will offer additional options for use, such as user interfaces or stored presets. If required, the individual software in the second memory may also be media information such as audio or video files. According to this embodiment of the invention, the LRU may be a video or audio player, whose second memory is designed to store appropriate media data. The second memory may be a connectable external memory such as a USB stick, a DVD, a BluRay disc or the like. Alternatively, it is possible for this LRU to have an internal second memory, in that the media data is read in, for example from a BluRay disc or a USB stick. By way of example, this second memory can be in the form of an SSD disk (solid state disk). According to the invention, the video and/or audio data may be transmitted and/or stored in an encrypted form, in order to render unauthorized use or unauthorized copying impossible, or to make this more difficult.

The LRU according to the invention is preferably designed to control the seat environment of a passenger. The seat environment includes the seat itself (which is preferably electrically adjustable), the entertainment system for the passenger, or else lighting and/or climate control for the seat area.

The LRU according to the invention can be fitted with individual software by each user, depending on his own requirement. In general, this individual software is not required for the basic operation of the LRU, but offers only additional control or usage options.

According to the invention, individual software can be stored in the second main memory in the following ways, by way of example:

a) a wire-based or wire-free connection to a server which stores individual software,
b) a wire-based or wire-free connection to a mobile appliance of the user,
c) a recording device for a memory medium.

The manufacturer of the LRU or of the system in which the LRU is included, or the operator of the aircraft, will in general allow only restricted choice, checked by him, of individual software for use on the LRU. This choice of individual software is preferably kept available in a memory, in particular a server which is accessible, for example, by means of a network. The server may be operated by the manufacturer of the LRU or of the system in which the LRU is included, by the operator of the aircraft, or by a trustworthy person (trusted operator).

According to the invention, it is possible to load desired individual software directly via a wire-based or wire-free connection (preferably the Internet) from the server into the second main memory of the LRU. This can be done, for example, when an aircraft is parked at the gate via the network of the airport or other networks (for example GSM, UMTS or HSPDA networks) and the aircraft network, in which case the two networks can communicate with one another via a cable connection or in a wire-free form (for example a W-LAN link).

According to the invention, it is also possible for no direct link to be made between the server of the LRU, but for the individual software to be buffer-stored in a user memory medium. In particular, this memory medium may be a mobile appliance of the user (mobile telephone, personal digital assistant or the like), or a memory medium such as a USB stick. Before arriving at a flight, the user can therefore select individual software desired by him on the server of the manufacturer of the LRU or of the system in which the LRU is included, or of the aircraft operator, and can load this into his mobile appliance. After boarding the aircraft, the user can load this individual software in the second main memory of the LRU, for example by insertion of the USB stick into an appropriate interface of the LRU, or by means of communication via the aircraft network between the LRU and his mobile appliance, for example mobile telephone or PDA. The loading of individual software into the main memory by means of a separate storage medium such as said USE stick or BluRay disc may be advantageous in particular when large amounts of data have to be transmitted, for example video and/or audio data.

For example, on boarding the aircraft, the mobile appliance of the user can log in with a wire-free network in the aircraft, such as a W-LAN or a GSM picocell. The user is identified on the basis of a unique identification feature, for example the IMEI number of his mobile telephone, the MAC address of his mobile appliance or an identification feature which is added to the software when the individual software is downloaded or obtained from the server. Furthermore, information relating to the seat location of the passenger can be transmitted to a server in the aircraft, for example from an electronic boarding pass, which is likewise stored on the mobile appliance, from a passenger list or the like which is made available by the aircraft operator.

In this way, the user boarding the aircraft can be identified, and the individual software stored in his mobile appliance can be downloaded via the aircraft network into the second main memory of the LRU associated with his seat environment.

Storage of the individual software in a mobile appliance of the user has the advantage that the user always, so to speak, carries the individual software preferred by him with him, and can use it on different flights without any problems.

Certain individual software will frequently be compatible only with one LRU or a choice of LRUs, and can be used only in it or them. Furthermore, it may be necessary to update individual software when, for example, the software required for the certification basis in the first main memory has been updated or modified in some other way. Furthermore, it is necessary to ensure that individual software which has been downloaded into the second main memory of the LRU is actually original software which has been released by the manufacturer of the LRU or of the system in which the LRU is included, or by the aircraft operator.

According to the invention, the individual software may contain a compatibility file which contains information relating to the LRUs or LRU platforms with which the corresponding individual software is compatible. The information can preferably be encrypted. A corresponding mating piece to a compatibility file such as this can be installed in the LRU. It is also possible for the integrity of the individual software to be checked, for example by so-called checksum formation.

In order to check the authorization of the user software, the user software may also contain an additional key. Authorization means that the corresponding individual software has in principle been cleared and is not "hacked" software, and, furthermore, the authorization may include a check being carried out to determine whether the respective user or passenger is actually authorized to use this individual software and whether this, for example, has been obtained legitimately.

For this purpose, the individual software may have a key which is checked against a corresponding matching key in the LRU. When the LRU or individual software is updated, the corresponding key in the LRU is amended by the system manager, as a result of which it now matches only the corresponding key for the updated individual software. By way of example, this prevents a user from loading obsolete individual software, which is still stored in his mobile appliance, into the LRU.

By way of example, the authorization of the user can be checked by using the IMEI number or MAC address of his mobile appliance and a further check can be carried out by entering individual features such as frequent flyer number, PIN, date of birth or the like.

In the case of a business or VIP jet which is used by the same group of people, stored individual software can frequently remain stored in the second main memory or the LRU once it has been loaded. The situation for a commercial aircraft is different. In this case, provision is preferably made for the LRU to automatically delete the second main memory when a predefined stimulus occurs. By way of example, this predefined stimulus may be a combination of a so-called system power cycle, in which the systems in the aircraft are restarted, and sensor information that the aircraft is on the ground (for example weight on the main undercarriage). By way of example, the stimulus for a short-haul aircraft must be chosen such that the passengers, which change several times in one day, when located on a seat, will in each case find a second main memory which has been deleted.

A further subject matter of the invention is an arrangement comprising an LRU according to the invention and a database in which individual software is stored for the second main memory of the LRU. The arrangement according to the invention makes it possible for a user to choose (using the Internet) individual software which is suitable for him in the database before arriving at a flight, for example, and then to load this, on arrival at the flight, in the second main memory of the LRU in one of the described manners.

The individual software stored in the database preferably contains a key as already described, which can also be provided with a user identification feature before transmission of the individual software. Furthermore, the individual software may contain a compatibility list as described above.

According to the invention, it is possible for the database to contain user profiles with a combination of the individual software preferred by a user. A user profile such as this makes it possible, for example, to automatically inform the user (for example via E-mail or SMS) when individual software used by him has been updated or has been modified in some other way. This makes it easier for the user to always have current versions of his individual software available, for example on his mobile appliance.

The subject matter of the invention is furthermore a method for operation of an LRU, as described in claims 14 to 16. The details of this method have already been disclosed above in the context of the explanation of the LRU and arrangement according to the invention.

One exemplary embodiment of the invention will be described in the following text with reference to the drawing, in which:

FIG. 2 shows an LRU for replaying media on board a vehicle, as part of an arrangement according to the invention.

Figure 1:
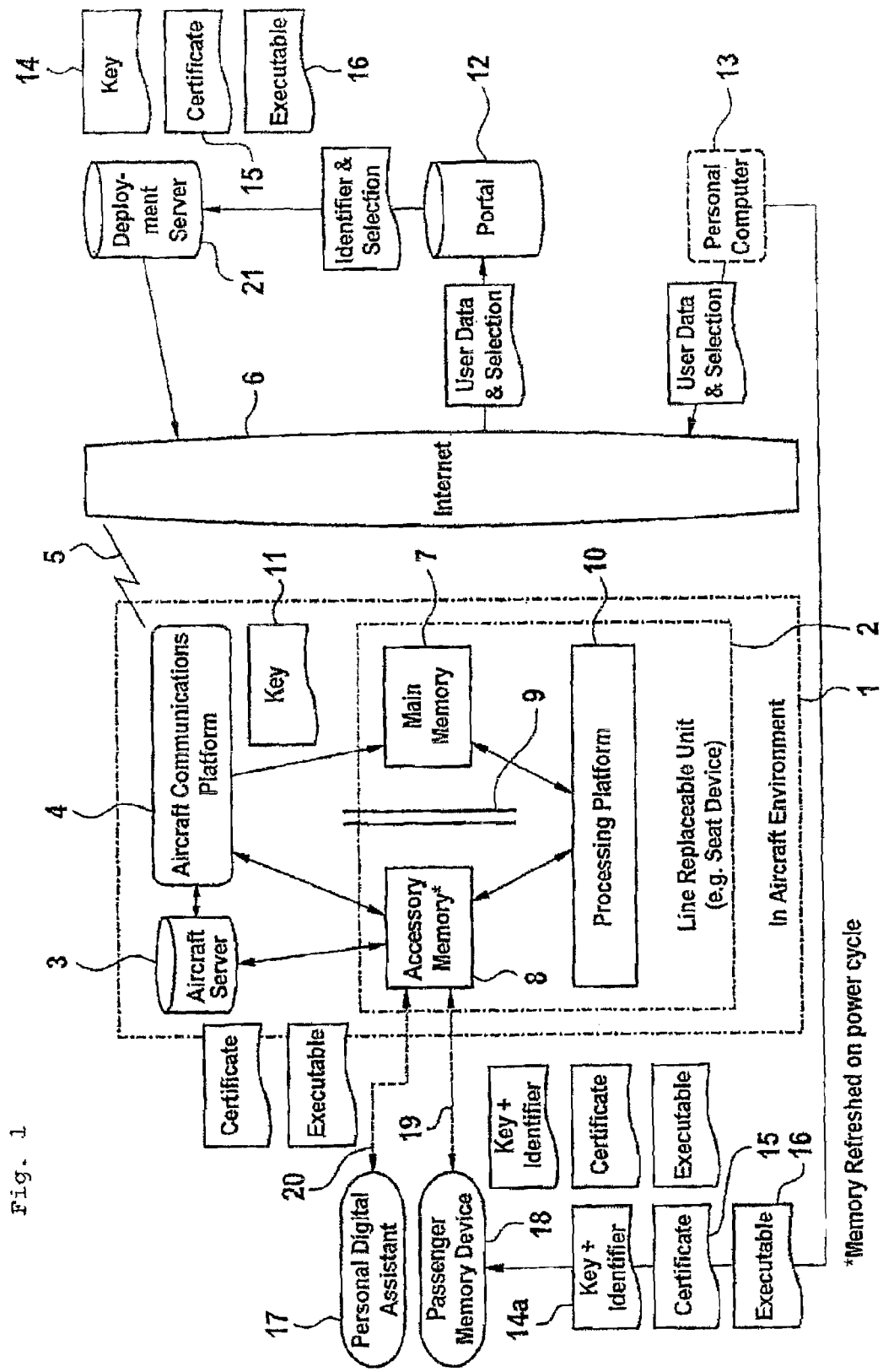
FIG. 1 shows, schematically, an arrangement according to the invention.

An LRU 2, which in the exemplary embodiment controls the seat environment, is located in an aircraft environment, which is indicated schematically at 1. The aircraft 1 has a server 3 (aircraft server), which can communicate with other components of the aircraft via a communication platform 4 (aircraft communications platform) which, for example, has an W-LAN. The communication platform 4 furthermore has a link, which is indicated at 5, to the Internet 6, and this Internet link may be wire-based or wire-free when the aircraft is parked, and may be wire-free when the aircraft is moving.

The LRU 2 has a first main memory 7 (Main Memory) and a second main memory 8 (Accessory Memory). The first main memory 7 and the second main memory 8 are separated from one another by a firewall which is indicated schematically at 9. A data processing installation 10 (processing platform) for the LRU can access the first main memory 7 and the second main memory 8.

The first main memory 7 contains the software or firmware which is essential for correct operation, and therefore essential to the certification of the LRU. Only the system operator can amend the content of this first main memory 7, for example via the communication platform 4, by means of a key which is indicated at 11. This restricted access to the first main memory 7 ensures the integrity of the software or firmware contained in it. The LRU 2 can preferably carry out its basic functions only with the assistance of the software in the first main memory 7.

The second main memory 8 of the LRU 2 is accessible in various ways, in order to store individual software in it. Suitable individual software is stored, for example, by the manufacturer of the LRU or of the system in which the LRU is included, or by the aircraft operator or by a person authorized by him or them, on a portal or server 12. A user can access this portal 12 via the Internet 6, for example by means of his personal computer 13. This allows him to choose a desired combination of individual software, and if required to download this onto the personal computer. A downloaded software package in this exemplary embodiment has a key 14, a compatibility certificate 15 and the actual individual software 16 (executable). As soon as this software has been downloaded onto the personal computer, the key 14 can additionally be provided with an identification feature for the user (key+identifier 14a). The described software package is transmitted from the personal computer 13 to a mobile appliance, for example a personal digital assistant 17 or a memory device 18 (passenger memory device), and is kept available there.

When the user boards the aircraft, he can set up a link, indicated at 19, 20, between his mobile appliance 17, or his memory device 18, and the LRU 2, in order to store the individual software in the second main memory 2. During this process, a check of the compatibility of the individual software with the LRU 2 is carried out by matching the compatibility list 15, which is also transmitted, to a corresponding compatibility list which, for example, can be stored in the aircraft server 3. Furthermore, the key with the identification feature 14a is checked before the individual software can be loaded into the second main memory 8, and before it can be executed by this main memory.

Another option for storage of individual software in the second main memory 8 is direct storage without passing via a user mobile appliance. For this purpose, the individual software selected by the user from the portal 12 is stored on a so-called deployment server 21, and is loaded in the second main memory 8 via the Internet 6, the link 5 to the communication platform 4 of the aircraft and, possibly, the aircraft server 3. In this case as well, the compatibility list 15 is once again checked. Optionally, the authorization of the user can also be checked. In the case of a VIP or business jet, this step can in some cases be omitted, if the corresponding individual software is chosen from the start by the aircraft operator for a small, unchanging circle of users.

As soon as the individual software has been loaded in the second main memory 8, the LRU can be used in the desired manner by the user, for example by means of a customized user interface on a touch screen for adjusting the seat environment, a customized entertainment program or the like. Furthermore, presets or preferences stored by the user, for example relating to the seat environment, the entertainment program or other information or entertainment software, can be loaded and made available to the user. The presets or preferences can be stored either locally on the mobile appliance 17 or the memory device 18, or centrally in the portal 12, the deployment server 21 or the aircraft server 3. In this way, the presets remain available for later flights. During a flight, such settings can also be stored temporarily in the second main memory 8. In the case of a commercial aircraft, a so-called power cycle of the LRU 2 is in each case carried out between two flights. During the process, the content of the second main memory is completely deleted.

FIG. 2 shows an LRU for replaying media on board a vehicle as part of an arrangement according to the invention. A replay unit 23 on board the aircraft is in the form of an LRU (line replaceable unit), and is inserted, at 24, into a slot for holding an LRU. A BluRay drive 25 can read media data from a BluRay disc. Data which has been read in can be stored on a 320 GB SSD 26. Furthermore, the replay unit 23 has a USB connection 27, via which media data or other data if required (for example operating system data) can likewise be read in. The replay unit 23 has a main board 28, which in turn has a first main memory 29. The first main memory 29 may be in the form of a removable data memory, for example an SD card. This contains the software or firmware which is essential for correct operation and therefore for the certification of the LRU.

Only media data is stored in the SSD 26, which is separate from the main memory 29. The content of the main memory 29 is not changed by any changes to the content of the SSD 26. The integrity of the content of the main memory 29 when the content of the SSD 26 is changed is ensured by physical separation, or by other suitable measures.

The processor on the main board 28 can decrypt encrypted media data, and can output this data to a network via HDMI links 30. A PSU (power supply unit) 34 is supplied with voltage (28 V DC) from the LRU interface 24, and feeds the assemblies of the LRU via supply lines, which are identified by PWR (power). It is possible within the scope of the invention for the media data to be recoded before it is output to the aircraft network; for example, video data can be coded using a standard with a relatively high compression rate, such as H.264. This can be done, for example, by means of a suitable encoder board, as is indicated in FIG. 2. Such coded video data is preferably not output via the HDMI links indicated at 30, but via the network link indicated at 35.

The invention claimed is:

1. Line replaceable unit (LRU) (2) for an aircraft (1), characterized in that the LRU has:
    a) a first main memory (7) which contains the software required for certification of the LRU (2),
    b) a second main memory (8), which is separate from the first main memory (7) and in which a user of the LRU can store individual software which does not adversely affect the certification basis of the LRU.

2. LRU according to claim 1, characterized in that the LRU is designed to control the seat environment of a passenger, preferably to control the seat and/or the entertainment system for a passenger.

3. LRU according to claim 1, characterized in that the LRU is designed to store and reproduce video and/or audio data.

4. LRU according to claim 1, characterized in that the second main memory (8) is accessible to a user in at least one of the following ways:
    a) a wire-based or wire-free connection (4, 5, 6) to a server (12, 21) which stores individual software,
    b) a wire-based or wire-free connection to a mobile appliance (17) of the user,
    c) a recording device for a memory medium (18).

5. LRU according to claim 1, characterized in that the LRU contains a device for compatibility checking of user software.

6. LRU according to claim 1, characterized in that the LRU contains a device for checking the authorization of user software.

7. LRU according to claim 1, characterized in that the LRU is designed to automatically delete the second main memory (8) when a predefined stimulus occurs.

8. LRU according to claim 7, characterized in that the predefined stimulus is a system power cycle.

9. Arrangement which has:
    an LRU according to claim 1,
    b) a database (12) in which individual software is stored for the second main memory of the LRU.

10. Arrangement according to claim 9, characterized in that the individual software stored in the database (12) contains a key.

11. Arrangement according to claim 10, characterized in that the key is provided with a user identification feature (14a) before the transmission of the individual software.

12. Arrangement according to claim 9, characterized in that the individual software stored in the database (12) contains a compatibility list (15).

13. Arrangement according to claim 9, characterized in that the database (12) contains user profiles with a combination of the individual software.

14. Method for operating an LRU of claim 1 with individual software, having the following steps:
    a) selection of individual software from a database (12) in an arrangement according to claim 9,
    b) transmission of the selected individual software to the second main memory (8) of the LRU,
    c) operation of the LRU using the individual software.

15. Method according to claim 14, characterized in that the selected individual software is transmitted to the second main memory (8) of the LRU
    by direct transmission of the individual software from the database (12, 21) to the second main memory of the LRU by means of a wire-based or wire-free connection.

16. Method according to claim 14, characterized in that the software transmitted or to be transmitted to the second main memory of the LRU is checked for compatibility with the LRU and/or authorization of the user.

17. Method according to claim 14, characterized in that the selected individual software is transmitted to the second main memory (8) of the LRU by transmission of the individual software from the database (12) to the second main memory (8) of the LRU via an intermediate storage medium.

18. thod according to claim 17, wherein said intermediate storage medium is a mobile appliance of a user.

* * * * *

UNITED STATES PATENT AND TRADEMARK OFFICE
CERTIFICATE OF CORRECTION

| | | |
|---|---|---|
| PATENT NO. | : 8,903,601 B2 | Page 1 of 1 |
| APPLICATION NO. | : 12/963800 | |
| DATED | : December 2, 2014 | |
| INVENTOR(S) | : Andrew Muirhead | |

It is certified that error appears in the above-identified patent and that said Letters Patent is hereby corrected as shown below:

In The Claims

Column 8, line 37, should read:

18. Method according to Claim 17, wherein said intermediate

Signed and Sealed this
Seventeenth Day of March, 2015

Michelle K. Lee
*Director of the United States Patent and Trademark Office*